United States Patent [19]

Campbell et al.

[11] Patent Number: 4,758,455
[45] Date of Patent: Jul. 19, 1988

[54] COMPOSITE FUEL AND VAPOR TUBE HAVING INCREASED HEAT RESISTANCE

[75] Inventors: Larry J. Campbell, Bolivar; Joseph M. Concaugh, Canton, both of Ohio

[73] Assignee: Handy & Harman Automotive Group Inc., Dover, Ohio

[21] Appl. No.: 943,417

[22] Filed: Dec. 2, 1986

Related U.S. Application Data

[63] Continuation-in-part of Ser. No. 753,743, Jul. 10, 1985, abandoned.

[51] Int. Cl.⁴ ............................................. F16L 11/08
[52] U.S. Cl. ..................................... 428/36; 138/125; 138/126; 138/128; 138/151
[58] Field of Search .................. 428/36; 138/124, 125, 138/126, 135, 138, 151, 128, DIG. 1

[56] References Cited

U.S. PATENT DOCUMENTS

| | | | |
|---|---|---|---|
| 2,436,421 | 2/1948 | Cork | 178/44 |
| 2,515,929 | 7/1950 | Ofeldt | 158/36.3 |
| 2,787,289 | 4/1957 | Press | 138/55 |
| 2,800,145 | 7/1957 | Peirels et al. | 138/25 |
| 3,233,036 | 2/1966 | Jachimowicz | 174/107 |
| 3,272,912 | 9/1966 | Jachimowicz | 174/107 |
| 3,379,821 | 4/1968 | Garner | 174/36 |
| 3,383,258 | 5/1968 | Houlston | 138/DIG. 1 |
| 3,551,586 | 12/1970 | Dembiak | 174/107 |
| 3,634,606 | 1/1972 | Iyengar | 174/106 D |
| 3,649,745 | 3/1972 | Volk | 174/107 |
| 3,858,618 | 1/1975 | Kaufman | 138/149 |
| 3,903,354 | 9/1975 | Dagforde | 174/107 |
| 3,943,271 | 3/1976 | Bahder et al. | 174/23 R |
| 4,042,776 | 8/1977 | Matsuba et al. | 174/110 R |
| 4,111,237 | 9/1978 | Mutzner et al. | 138/125 |
| 4,125,739 | 11/1978 | Bow | 174/36 |
| 4,276,908 | 7/1981 | Horne | 138/125 |
| 4,327,248 | 4/1982 | Campbell | 174/107 |
| 4,384,595 | 5/1983 | Waskewicz et al. | 138/127 |
| 4,448,829 | 5/1984 | Kohler | 227/107 |
| 4,472,595 | 9/1984 | Fox et al. | 174/36 |
| 4,559,973 | 12/1985 | Hane et al. | 138/138 |

*Primary Examiner*—John E. Kittle
*Assistant Examiner*—Donald J. Loney
*Attorney, Agent, or Firm*—Pennie & Edmonds

[57] ABSTRACT

A composite fuel and vapor tube having increased heat resistance with a composite wall having a relatively thin nylon liner, a metal strip about the liner and having a longitudinal seam, the tube being encased within a polyethylene jacket. The line thus formed has increased resistance to heat, abrasion and various fuels, is bendable and is capable of maintaining its shape after bending or forming operations.

32 Claims, 1 Drawing Sheet

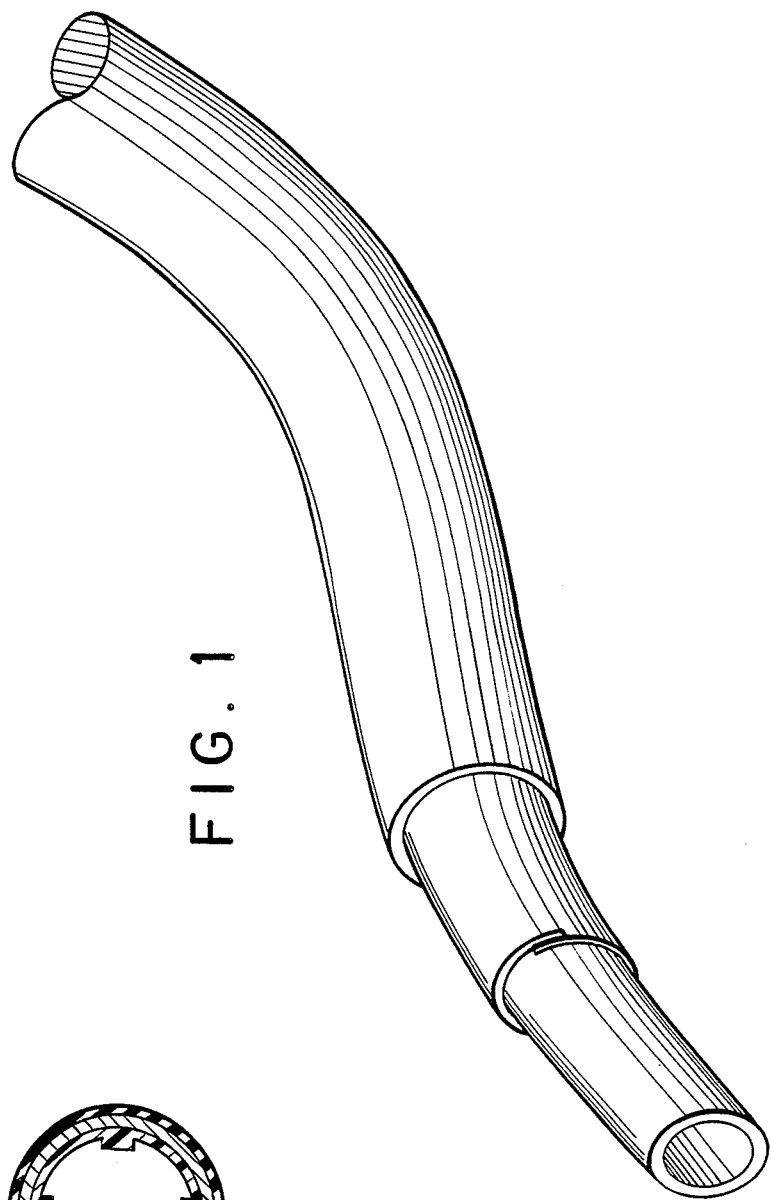
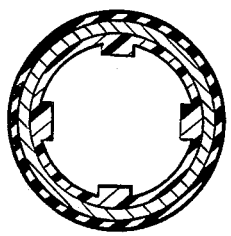

COMPOSITE FUEL AND VAPOR TUBE HAVING INCREASED HEAT RESISTANCE

CROSS REFERENCE TO RELATED APPLICATIONS

This application is a continuation-in-part of application Ser. No. 753,743, filed July 10, 1985, now abandoned.

TECHNICAL FIELD

The present invention relates to the field of tubing manufacture and in particular to the field of automotive fuel and vapor transmission tubes.

BACKGROUND ART

Presently manufactured fuel lines for automobiles are made of relatively thick walled tubes of nylon 11 of 12. These materials provide the desired resistance to fuels such as gasoline, both leaded, unleaded and supra, diesel fuel, methanol, ethanol and sour gas. The nominal wall thickness of such tubes is approximately forty-thousandths of an inch (1 mm), since this provides the desired mechanical requirements of burst pressure (500 psig, minimum), sag resistance, kink resistance, cold impact resistance (at least 1 ft. lb. at minus 40° C.) and general handling durability. For fuel transport alone, however, a wall thickness of only one- to two-thousandths of an inch is actually necessary. The remainder of the wall thickness is necessary to protect and support the inner, fuel containing thickness, as well as to provide the necessary mechanical properties to the tube.

In order to properly route the fuel line throughout the vehicle, turns and bends are generally thermally preformed into the thick tube.

In the same manner, vapor tubes for recycling the fuel vapors in an automobile pollution control device must be resistant to the fuel as well as to combustion vapors. For this use, the tubing must be made of a fuel and combustion gas resistant material which, as with fuel lines, are generally thermally preformed.

One significant problem with the use of thermoplastic tubes (such as polyethylene, polypropylene, polyvinyl chloride or the like) is the relatively high gas vapor permeation of those materials. Therefore, in order to successfully transport fuel, tubes of those thermoplastic material must be surface treated to block or reduce such vapor transmission. Furthermore, no suitable method currently exists for surface coating the inner diameter of extruded thermoplastic tubing.

Also, for many applications, plastic tubing cannot prudently be used because of the work environment. Plastic tubing in the area of a welding operation is subject to rupture by weld splatter which may melt the tube wall. This occurrence could have disastrous effects if the tube is carrying a flammable substance, such as the fuel. Alternatively, to prevent against excessive abrasion or hot spots in localized areas, it is possible to provide this plastic tube with additional components, such as protective sleeves of rubber, metal or the like, in such localized areas. A disadvantage of this solution is that it is not always known where such problem areas will be encountered.

Therefore, thin walled metal tubing has been considered for this application, but it has not been found satisfactory due to its poor bending characteristics. A thin tube wall on an inner bend radius kinks very readily due to its inability to withstand a compressive load.

Flexible hose assemblies of plastic and metal for fuel lines are shown in the prior art. U.S. Pat. No. 2,787,289 to Press discloses a flexible line made of an extruded polytetrafluoroethylene tube which is surrounded by one or more layers of reinforcing wire braid of stainless steel and covered by a flexible tubular cover which is made of asbestos impregnated with a substantially oil proof material. This type of line, although flexible, is also resilient so that it is not capable of maintaining the shape into which it is bent. This is undesirable for many automotive applications since at least some type of semi-rigidity or shape holding property is necessary to maintain the line in the proper position.

In U.S. Pat. No. 4,327,248 to Campbell, there is disclosed a shielded electrical cable. The shield is made of a flexible metal tape with a coating of a copolymer of ethylene with a monomer having a reactive carboxyl group bonded to at least one of its sides. An adhesive is used to bond the coating to a flexible or semi-rigid non-olefinic polymeric material.

The present invention resolves the deficiencies of the prior art and provides a low cost plastic to metal bonded encasement which can be mechanically formed or bent to a predetermined configuration and which further can retain its shape after being formed or bent without kinking. Furthermore, this composite tube provides increased resistance to abrasion, hot spots and vapor permeation than those of the prior art, due to its ability to rapidly dissipate heat axially and radially along the composite tube.

SUMMARY OF THE INVENTION

One aspect of the present invention relates to a bendable tubular article comprising a tubular liner made of petroleum resistant material in a sufficient thickness to contain fuel therein; a bendable metal strip surrounding the liner throughout its length in a sufficient thickness to form a bendable tubular composite having an unsupported self-sustaining shape when bent with sufficient heat dissipation capabilities to rapidly dissipate heat axially along the strip to prevent localized overheating of the article due to exposure to heat or sparks; an adhesive layer on at least one side of the metal strip; and a flexible jacket encasing the composite. The self-sustaining characteristic of the composite is greater than the flexibility of the liner or plastic jacket so that the article retains its shape after bending.

An alternate embodiment of the invention contemplates a tubular article comprising a liner made of petroleum resistant material of a thickness sufficient to contain petroleum fuel therein but less than about 0.5 mm; and an aluminum strip surrounding the liner throughout its length having a thickness of between about 0.2 and 0.4 mm and having at least two margins which meet to form a seam so as to form a bendable tubular composite having an unsupported, non-kinking self-sustaining shape when bent. This strip provides a fuel vapor permeation barrier as well as a thermal barrier which rapidly dissipates heat axially therealong. The article also includes an adhesive layer on at least the outer surface of the strip to adhere the margins forming the seam, and a plastic jacket encasing the aluminum strip and adhered thereto by the adhesive layer. The thickness ratio of the plastic jacket to the aluminum layer in the article is preferably between about 3.5:1 and 6.3:1.

The invention also relates to a bendable tubular article comprising a plastic liner made of petroleum resistant material; a bendable metal strip surrounding the liner throughout its length in a sufficient thickness for forming a bendable tubular composite having an unsupported, non-kinking self-sustaining shape when bent and to provide a barrier for protection against fuel vapor permeation and against heat due to the high heat capacity and thermal conductivity of the metal; an adhesive layer on each side of the metal strip; and a flexible plastic jacket encasing the composite and adhered thereto by the adhesive layer. Also, as above, the self sustaining characteristic of the composite is greater than the flexibility of the plastic jacket so that the article retains its shape when bent.

BRIEF DESCRIPTION OF THE DRAWINGS

The nature, advantages, and various other additional features of the invention will appear more fully upon consideration of the illustrative embodiments now to be described in detail in connection with the accompanying drawing figures, where:

FIG. 1 is a partially cut-away perspective view of the fuel or vapor tube of the invention; and FIG. 2 is a cross-sectional view of an embodiment of the invention having internal ribs.

DETAILED DESCRIPTION OF THE PREFERRED EMBODIMENTS

The tubing of the invention includes a thin metal barrier formed around a flexible nylon fuel or vapor tube component. A plastic jacket or casing, preferably polyethylene, may be used to surround the composite, which preferably has a thin metallic layer such as aluminum surrounding a thin petroleum resistant liner of nylon or the like. The metallic layer offers sufficient strength to dominate over the resiliency of the flexible liner and polyethylene jacket when the tubing is bent into a desired configuration. The tube thus has a formability characteristic and maintains the configuration into which it is formed. Also, the metal strip enables the liner to be bendable without kinking or buckling.

The presence of the plastic/metal covering over the actual conduit inner tube offers sufficient mechanical protection to safely allow a much smaller wall thickness of the inner liner. Thus, the inner liner can be made of an expensive engineering thermoplastic with the reduced wall thickness resulting in significant cost savings over comparable thick-walled tubing of the same material.

As shown in FIG. 1, the fuel or vapor tube includes on inner liner 1 made of any fuel resistant material. A preferred material is nylon 11 or 12, and is used in a thickness of approximately 0.05 to 0.5 mm (two to twenty mils). The liner 1 is cylindrical in shape. Longitudinally wrapped about the longitudinal axis of the liner is a metal strip 2 which forms a longitudinally extending lap joint 4. The metal strip 2, which is preferably made of aluminum, is approximately 0.2 to 0.4 (eight to sixteen mils) thick. Encasing the strip 2 is a flexible plastic casing 5. Extruded polyethylene or polypropylene or coatings of these materials are generally used, but flame retardant materials such as polyvinyl chloride, chlorinated polyethylene, or polychloroprene rubber can also be used for more critical applications.

The metal strip is preferred coated on both sides with an adhesive 3 capable of bonding to the outer jacket and, for some applications, the inner liner as well. When thermoplastic liner tubes and/or jackets are used, the adhesive is made from a copolymer of ethylene and a monomer having a reactive carboxyl group such as acrylic acid or an acrylic acid ester. An example of such a coated aluminum strip is currently manufactured under the "Zetabon" trademark by Dow Chemical Company. It is understood that the strip 2 is made of a sufficiently bendable metal which has the characteristic of staying in bent shape. Aluminum is preferred. Alternatively, the aluminum strip may be coated with adhesive 3 on one side only which would provide sufficient adhesion between the laps of the joint 4. A two-sided coating can be used, however, when adhesive bonds to the liner and jacket components are desired.

The adhesive is present at least on the outer surface of the tube formed by aluminum strip 2. However, the ethylene/acrylic copolymer described above does not bond to materials such as nylon as they are adhesively incompatible. Thus, when adhesion to a fuel tube of nylon is desired, a different adhesive layer must be used on the inner surface of the metal tube. The above adhesive, however, is compatible with polyethylene and is commercially available on an aluminum strip: therefore, an inner liner of polyethylene is preferred when bonding to the aluminum strip 2 through an adhesive 3 is desired. The casing is usually extruded onto the aluminum strip 2 after the strip is wrapped around the liner, but it can also be applied as a coating, if desired.

As shown in FIG. 2, the liner 1 may be provided with longitudinally extending ribs 6 for enhancing the rigidity and anti-buckling of the liner 1. The ribs 6 may extend longitudinally parallel to the axis of the liner or they may follow a helical path along the inner surface of the liner.

The tube is formed by continuously wrapping the adhesive coated aluminum strip around the extruded liner. The liner may be supplied from rolls or extruded as part of the manufacturing procedure. The aluminum strip has two longitudinal margins which overlap to form a longitudinally extending lap joint. The polyethylene casing is then extruded around the aluminum tube which has the liner already disposed within it. The heat of the extrusion process causes the polyethylene to bond to the adhesive and the adhesive in the lap joint to bond producing a securely attached aluminum tube and polyethylene jacket with a nylon liner disposed therein.

Alternately, the adhesive coated strip can be spirally wrapped around the liner before the casing is extruded or coated thereupon.

The liner tube of the invention has a significantly reduced wall thickness (at least 50% thinner, on the order of between about 2 and 20 thousandths or 0.05 to 0.5 mm) and is made of a fuel resistant plastic. This tube is encased with an adhesive coated aluminum tape, 0.2 to 0.4 mm thick. The metallic layer is then covered with an additional layer of plastic.

The invention has achieved the following characteristics at no significant cost change compared to 1 mm thick nylon 11 or 12 tubes:

| | |
|---|---|
| Burst Strength | 30% improvement (typically, 1700 PSIG vs 1300 PSIG) |
| Crush Resistance | 95% improvement (typically, 72 lbs. vs 37 lbs.) |
| Cold Impact Resistance | Improved by approximately 20° F. to achieve a 1 ft. lb. value |
| Sag Resistance | Improved by a factor of at least 2. |

| | -continued |
|---|---|
| Kink Resistance | Approximately the same |

It has also been determined that, with tubes of a 0.5 mm nylon 12 liner, 0.2 mm aluminum, and a polyethylene outer covering, the following plastic-to-metal ratios (i.e., for outer covering thickness to metal strip thickness) are highly desirable:

| Liner Tube I.D. | Plastic-to-Metal Ratio |
|---|---|
| 4.8 mm | 3.5:1 to 4:1 |
| 6.3 mm | 4.8:1 to 5.2:1 |
| 9.5 mm | 5.6:1 to 6.3:1 |

This ratio appears to give the optimum blend of bendability with kink resistance. It is also possible to utilize other plastic-to-metal ratios if the outer plastic jacket is made of a more elastomeric material or if the metal thickness is varied.

In another embodiment of the invention, the liner tube is made of an ordinary thermoplastic such as polyethylene polypropylene, polyvinyl chloride or the like. This construction allows both the inner tube and the outer jacket to bond to the adhesive coated tape and form an integral composite. This composite yields improved kink resistance if the same plastic-to-metal ratios decribed above are used or, if smaller ratios of plastic-to-metal are used, comparable kink resistance can be obtained, all while maintaining the mechanical bending, heat resistance and fuel transport characteristics of the composite tube.

The composite tube of the invention provides substantially superior resistance to heat and hot spots caused by weld spatter, sparks and the like. This is due to the thickness of the metal strip which rapidly transmits and dissipates heat axially along its length in both directions, thus quickly reducing and minimizing the size and intensity of any hot spots on the composite tube. This avoids rupture or failure of the plastic components of the tube by melting or burning in the areas of the hot spots.

Heat transfer per unit time is calculated using the following formula:

$$B.T.U./Hr. = KA(\Delta t/L)$$

where
K=Materials thermal conductivity
A=Cross sectional area
$\Delta t/L$=Temperature gradient The thermal conductivities of the composite tube materials are as follows:

$K_{nylon} = 2.08$
$K_{polyethylene} = 3.42$
$K_{aluminum} = 1400$

As can be seen with the magnitude of differences between the conductivities between the plastics and the aluminum, one can easily visualize what happens. As heat from an external source is transmitted through the outer layer of plastic, it confronts the aluminum layer. Due to its extremely high thermal conductivity, the aluminum transfers the heat very rapidly in axial directions. This rapid axial transfer spreads the heat over a greater area of the tube thus avoiding local hot spots which can burn or melt the plastic portions. This decreases the rate of actual temperature rise of any incremental point of the liner tube, thus increasing time to failure due to such hot spots. The heat transfer advantages are enhanced when fuel is flowing through the tube, since the moving fuel also helps to dissipate the heat.

While aluminum is the most preferred material for the metal strip, other metals such as copper, nickel, steel, stainless steel, and alloys thereof provide similar advantages in thermal conductivity compared to plastic.

The construction of the composite tube of the invention also allows other thermoplastics such as polyethylene, polypropylene, polyvinylchloride and the like to be used as the inner fuel-conducting tube. Polyethylene is a very desirable material for fuel delivery systems because it is lightweight, tough, chemically and environmentally resistant and inexpensive, but it is very poor regarding fuel vapor permeation. It has a permeation rate approximately 11000 to 12000 times greater than nylon. One variation of the plastic/metal composite fuel and vapor tube of this invention consists of the polyethylene liner tube embodiment. Since the metal layer of the invention totally encases the liner tube, all vapor permeation is blocked except for the minimal amount that can permeate through the overlap area of the wrap. This eliminates a secondary sulphonation or fluorination treatment of the surface of the polyethylene to reduce vapor permeation as is presently used with polyethylene fuel tanks.

The bonded, unitized construction of the plastic metal embodiment, when used in the proper ratios of plastic-to-metal as described above, achieves a tubular item that can be mechanically formed into the required three dimensional forms, in the same manner as with metallic tubing, while maintaining the necessary heat resistance, chemical corrosion and fuel resistance of plastic tubes.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A bendable tubular article for transport of fuels such as gasoline, diesel fuel, methanol, ethanol, sour gas and the like comprising:
   (a) a flexible tubular liner made of petroleum resistant material; and
   (b) a bendable metal strip surrounding the liner throughout its length in a sufficient thickness to form a bendable tubular composite having an unsupported self-sustaining shape when bent and sufficient heat dissipation capabilities to rapidly dissipate heat axially along the strip to prevent localized overheating of the article due to exposure to heat or sparks; wherein the self sustaining characteristic of said composite is greater than the flexibility of said liner so that the article retains its shape after bending.

2. The article of claim 1 further comprising an adhesive layer on at least one side of the metal strip and a flexible jacket encasing said composite.

3. The article of claim 2 wherein the jacket is made of a halogenated thermoplastic or halogenated elastomer and the thickness ratio of the jacket to the metal strip is between about 3.5:1 and 6.3:1.

4. The article of claim 1 wherein the liner includes rib means for increased rigidity of the article and wherein each side of the strip has an adhesive layer.

5. The article of claim 4 wherein the rib means comprises a plurality of reinforcing ribs on the internal diameter of the liner.

6. The article of claim 1 wherein the liner is made of a thermoplastic in a thickness up to about 0.5 mm and the metal strip is aluminum.

7. The article of claim 1 wherein the liner is made of nylon in a thickness up to about 0.5 mm and the metal strip is aluminum.

8. A bendable tubular article for transport of fuels such as gasoline, diesel fuel, methanol, ethanol, sour gas and the like comprising:
   (a) a liner made of petroleum resistant material of a thickness sufficient to contain petroleum fuel but less than about 0.5 mm;
   (b) an aluminum strip surrounding said liner throughout its length, having a thickness of between about 0.2 and 0.4 mm and having two longitudinal margins which meet to form a seam, said strip providing a fuel vapor permeation barrier and a thermal barrier which rapidly dissipates heat axially therealong; and
   (c) an adhesive layer on at least the outer surface of said strip to adhere said margins forming the seam so as to form a bendable tubular composite having an unsupported, non-kinking, self-sustaining shape when bent.

9. The article of claim 8 further comprising a jacket encasing said aluminum strip and adhered thereto by said adhesive layer; the thickness ratio of the jacket to the aluminum layer in said article being between about 3.5:1 and 6.3:1 to provide the optimum blend of bendability and kink resistance for the composite.

10. The article of claim 9 wherein the diameter of the liner is between about 4.8 and 9.5 mm.

11. The article of claim 9 wherein the liner further comprises a plurality of reinforcing ribs along its internal diameter, and wherein the jacket is made of a halogenated thermoplastic or a halogenated elastomer.

12. The article of claim 9 wherein the liner is nylon, the jacket is made of a thermoplastic material, and the seam is a longitudinal lap seam.

13. A bendable tubular article for transport of fuels such as gasoline, diesel fuel, methanol, ethanol, sour gas and the like comprising:
   (a) a plastic liner made of petroleum resistant material;
   (b) a bendable metal strip surrounding said liner throughout its length such that said liner is movably disposed therein and said metal strip being of a thickness sufficient to reduce moisture vapor transmission through the article and to form a bendable tubular composite having an unsupported self-sustaining shape when bent having sufficient heat dissipation capabilities to rapidly transmit and dissipate heat axially therealong to reduce and minimize the size and intensity of hot spots upon said article caused by weld spatter, sparks and the like;
   (c) an adhesive layer on the outer surface of said metal strip; and
   (d) a plastic jacket encasing said metal strip and adhered thereto by said adhesive layer such that said article can be bent to a desired shape and the metal strip will dominate to hold the article in the desired shape.

14. The article of claim 13 wherein the liner is nylon, the metal strip is aluminum and the plastic jacket is polyethylene.

15. A bendable tubular article for transport of fuels such as gasoline, diesel fuel, methanol, ethanol, sour gas and the like comprising:
   (a) a liner made of petroleum resistant material of a sufficient thickness necessary to contain petroleum fuel but less than about 0.5 mm;
   (b) an aluminum strip surrounding said liner throughout its length having a thickness between about 0.2 and 0.4 mm and having two longitudinal margins which meet to form a longitudinal seam, said strip providing a fuel vapor permeation barrier and a thermal barrier which rapidly dissipates heat axially therealong;
   (c) an adhesive layer on the outer surface of said strip to adhere said margins forming the longitudinal seam; and
   (d) a jacket encasing said aluminum strip and adhered thereto by said adhesive layer; the thickness of the aluminum layer in said article being sufficient to form a bendable tubular composite having an unsupported, non-kinking self-sustaining shape when bent.

16. The article of claim 15 wherein said longitudinal seam is a lap seam, and further including an adhesive coating on the inner surface of said aluminum strip.

17. The article according to claim 16 wherein said adhesive layer is a copolymer of ethylene and a monomer having a reactive carboxyl group, and further comprising longitudinally extending ribs on the inside surface of said liner to provide increased rigidity to the article.

18. A bendable tubular article for transport of fuels such as gasoline, diesel fuel, methanol, ethanol, sour gas and the like comprising:
   (a) a cylindrical liner made of nylon and having an axial passage therethrough;
   (b) an aluminum strip having a thickness between about 0.2 and 0.4 mm and having two longitudinal margins which are wrapped to form a longitudinal lap seam at he overlap of said margins and encases said liner, said strip providing a fuel vapor permeation barrier and a thermal barrier which rapidly dissipates heat axially therealong;
   (c) an adhesive layer of a copolymer of ethylene and a monomer having a reactive carboxyl group coating both the inside surface and the outside surface of said aluminum strip and bonding the inner surface of one longitudinal margin of said aluminum strip to the outer surface of the remaining longitudinal margin in order to form said lap seam; and
   (d) an extruded polyethylene jacket surrounding said aluminum strip and bonded to the outer surface thereof by said adhesive layer, said article forming a bendable tubular composite having an unsupported, non-kinking self-sustaining shape when bent.

19. The article of claim 18 wherein the jacket is made of chlorinated polyethylene.

20. A bendable tubular article for transport of fuels such as gasoline, diesel fuel, methanol, ethanol, sour gas and the like comprising:
   (a) a plastic liner made of petroleum resistant material;

(b) a bendable metal strip surrounding the liner throughout its length in a sufficient thickness to form a bendable tubular composite having an unsupported, non-kinking self-sustaining shape when bent and sufficient heat dissipation capabilities to rapidly dissipate heat axially along the strip to prevent localized overheating of the article due to exposure to heat or sparks due to the high heat capacity and thermal conductivity of the metal;

(c) an adhesive layer on the outer surface of said metal strip; and (d) a flexible plastic jacket encasing said composite and adhered thereto by said adhesive layer;

wherein the self sustaining characteristic of said composite is greater than the flexibility of said plastic jacket so that the article retains its shape when bent.

21. The article of claim 20 wherein the liner includes rib means for increased rigidity of the article.

22. The article of claim 20 wherein the liner is made of nylon in a sufficient thickness to contain fuel therein but less than 0.04".

23. The article of claim 20 wherein the jacket is made of chlorinated polyethylene to impart additional flame retardance to the article.

24. A bendable tubular article for transport of fuels such as gasoline, diesel fuel, methanol, ethanol, sour gas and the like comprising:

(a) a tubular plastic liner made of petroleum resistant material in a sufficient thickness to contain fuel therein and having longitudinal reinforcing ribs along its internal diameter;

(b) a bendable metal strip surrounding the liner throughout its length in a sufficient thickness to form a bendable tubular composite having an unsupported self-sustaining shape when bent with sufficient heat dissipation capabilities to protect against tube rupture due to exposure to heat or sparks;

(c) an adhesive layer on each side of the metal strip;

(d) a flexible plastic jacket encasing said composite and adhered thereto by said adhesive layer;

wherein the self sustaining characteristic of said composite is greater than the flexibility of said plastic jacket so that the article retains its bent shape.

25. The article of claim 24 wherein the jacket is made of chlorinated polyethylene to impart additional flame retardance to the article.

26. A bendable tubular for transport of fuels such as gasoline, diesel fuel, methanol, ethanol, sour gas and the like comprising:

(a) a plastic liner made of petroleum resistant material;

(b) a bendable metal strip surrounding the liner throughout its length in a thickness sufficient to dissipate localized external heat axially thereof so as to reduce the radial inward transmission of said heat and for forming a bendable tubular composite having an unsupported, non-kinking, self-sustaining shape when bent;

(c) an adhesive layer on the outer side of said metal strip; and (d) a flexible jacket encasing said composite and adhered thereto by said adhesive layer;

wherein the self sustaining characteristic of said composite is greater than the flexibility of said liner or plastic jacket so that the article retains its shape when bent.

27. The article of claim 26 wherein the jacket is made of a chlorinated thermoplastic or a chlorinated elastomer.

28. The article of claim 26 wherein the liner is nylon, the metal strip is aluminum, the plastic jacket is polyethylene, and the thickness ratio of the jacket to the metal strip is between 3.5:1 and 6.3:1 to provide the optimum blend of bendability and kink resistance to the composite.

29. The article of claim 26 wherein the liner further comprises a plurality of longitudinally extending ribs along its inside diameter to provide increased rigidity to the article.

30. The article of claim 26 wherein the adhesive layer is a copolymer of ethylene and a monomer having a reactive carboxyl group.

31. The article of claim 28 wherein the liner has a thickness sufficient to contain fuel therein up to about 0.5 mm and a diameter between about 4.8 and 9.5 mm.

32. A bendable tubular article for transport of fuels such as gasoline, diesel fuel, methanol, ethanol, sour gas and the like comprising:

(a) a plastic liner made of petroleum resistant material having a diameter between about 4.8 and 9.5 mm and a thickness sufficient to contain fuel therein up to about 0.5 mm;

(b) a bendable metal strip surrounding the liner throughout its length in a thickness sufficient to avoid rupture or failure of the plastic components of the article by melting or burning when exposed to heat, sparks or flame, and for forming a bendable tubular composite having an unsupported, non-kinking, self-sustaining shape when bent;

(c) an adhesive layer of a copolymer of ethylene and a monomer having a reactive carboxyl group located on the outer side of said metal strip; and (d) a flexible jacket of a material which is compatible with said adhesive layer, wherein the thickness ratio of the jacket to the metal strip is between about 3.5:1 and 6.3:1 to provide the optimum blend of bendability and kink resistance to the composite.

* * * * *